Nov. 27, 1928.
P. VANNINI
1,692,875
PROTECTIVE HOUSING FOR ELECTRICAL DEVICES
Filed Feb. 26, 1927    2 Sheets-Sheet 1
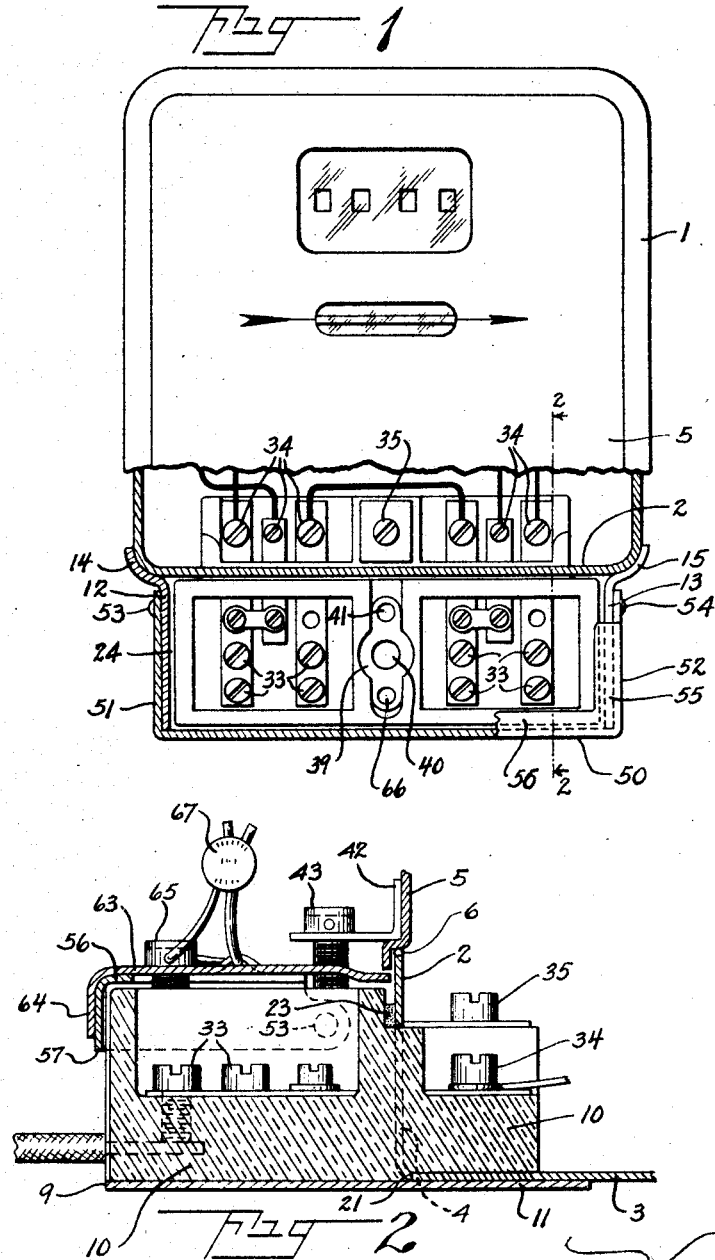

Nov. 27, 1928.

P. VANNINI 1,692,875

PROTECTIVE HOUSING FOR ELECTRICAL DEVICES

Filed Feb. 26, 1927    2 Sheets-Sheet 2

Patented Nov. 27, 1928.

1,692,875

UNITED STATES PATENT OFFICE.

PHILIPP VANNINI, OF ZUG, SWITZERLAND, ASSIGNOR TO LANDIS & GYR A.-G., A LIMITED JOINT-STOCK COMPANY OF SWITZERLAND.

PROTECTIVE HOUSING FOR ELECTRICAL DEVICES.

Application filed February 26, 1927, Serial No. 171,286, and in Switzerland March 19, 1926.

The invention relates to new and useful improvements in electrical instrument casings, including a protective housing for electrical terminal blocks, and in certain aspects thereof more particularly to such housings applied to electricity meters and their terminal blocks.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Fig. 1 is a front elevation, with parts in section and parts broken away, of an exemplary embodiment of the invention;

Fig. 2 is a fragmentary, vertical section, greatly enlarged, taken on line 2—2 of Fig. 1;

Figure 3:
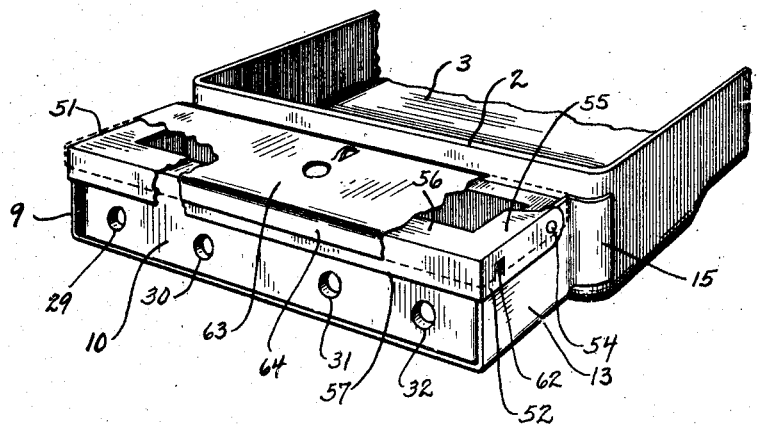
Fig. 3 is a fragmentary perspective, with parts broken away, corresponding to the lower part of Fig. 1.

The invention is directed to providing in connection with electrical instrument casings a protective housing for electrical terminal blocks which are usually made of bakelite or composition. The invention has in view the housing and protection of such blocks capacitated to take all the leads or connections for the particular meter or other instrument and the line connections therefor. In many of its aspects, however, the invention is applicable to and useful with other kinds of blocks and terminal devices.

The invention is further directed to providing a protective housing structure for terminal blocks which is especially adaptable and useful with stamped or struck-up meter, or other instrument casings; and in certain of its features relates to an integral structure including such an instrument casing and terminal block housing. Certain features of such a combined or common structure are also useful with other kinds of casings.

As here exemplarily embodied, the invention comprises, broadly stated, a stamped or struck-up sheet metal meter casing with an aperture formed therein through which the terminal block projects partially into the meter casing, a protective sheet metal housing being welded or otherwise fixed to the exterior of the meter casing and enclosing the part of the terminal block exterior to the meter casing. The housing has a part positionable to protect the upper exterior edge of the terminal block, after it has been inserted in place within the housing. Other features of the invention will be initially set forth in the following detailed description of the present preferred embodiment of the invention.

It will be understood that the foregoing general description and also the appended detailed description are explanatory and exemplary of the invention but are not restrictive thereof.

Referring now in detail to the embodiment of the invention illustrated by way of example in the accompanying drawings, it is shown applied to an electricity meter. The invention finds one of its extensive and valuable applications in connection with meter casings of stamped metal, although it is useful with other kinds of casings.

As embodied, a meter casing 1 is shown having a front wall 2 and a bottom wall 3. An aperture 4 is formed in the bottom part of the front wall, in which the terminal block fits nicely, and through which it projects into the meter casing, as best shown in Fig. 2. A lid 5 fits onto the front opening of the meter casing; and a resilient dust seal 6 is provided about the edges of the opening. The meter casing and lid may be fastened in any suitable or desired manner.

The protective housing 9 for the terminal block 10, as here exemplarily embodied, is of a form especially adapted for use with the stamped and struck-up instrument casing already described. In this embodiment the housing comprises a bottom 11 and preferably two sides 12 and 13, integral with and extending upwardly from the side edges of the exterior portions of the housing bottom plate 11. The inner end of the housing bottom plate extends beneath and in contact with the bottom plate 3 of the meter casing. The inner ends of the side plates 12 and 13 of the housing are shaped at 14 and 15 to contact with the side walls of the meter casing. All these overlapped edges of the housing are permanently fixed to the meter casing in any suitable manner, as by welding or otherwise.

The terminal block 10 may be slid into position within the protective housing, and has a shoulder 21 adapted to register against the front edge of the bottom plate 3 of the meter to properly position the terminal block. The block when so positioned will completely and nicely fill the aperture 4 in the front of the meter casing, as is best shown from Figs. 1 and 2, both along the vertical and top horizontal edges of the opening. A suitable seal 23 of cement or other proper substance may be used to effectively close the junction of these parts.

The terminal block is preferably proportioned, however, so that there is a small space 24 between the block and the inside walls of the exterior walls of the protective housing, and this serves as a protection to the terminal block from injury in case of dropping or other accident or rough handling.

The circuit connections on the terminal block may be of any suitable or desired form so far as concerns the present invention, and will be described only in the most general way. As embodied, there are shown four openings 29, 30, 31 and 32 in the outer face of the terminal block to receive the line terminals, and these are connectible with clamping screws indicated generally by reference numeral 33. The clamping or contact screws for the meter terminals, at the inner end of the terminal block, are indicated generally by reference numeral 34.

The terminal block after it is positioned, partly within the meter casing and partly within the protective housing, is fastened in place by suitable means such as a screw 35 passing through a part of the interior end of the block and threaded into the bottom plate 3 of the meter casing, and if desired into the bottom plate 11 of the housing.

Fixed on the central upper face of the block is a countersunk plate 39, having a central aperture 40, the block being correspondingly apertured, to receive a screw which is used to fasten the meter in position upon the wall or elsewhere. In the embodied means for fastening the meter casing, the plate 39 is also apertured at 41, and an internally screw-threaded opening is formed in the terminal block. A bracket 42 is fixed to the lower part of the meter casing lid 5 and a screw 43 projects through an aperture in this bracket and is screw-threaded into the opening 41. The screw 43 and the bracket 42 will be provided with sealing means in the usual manner.

Means are provided by the invention for protecting the exterior upper edge of the terminal block from injury; and this feature is especially valuable when the terminal block is made from relatively readily fracturable material. This protective device is preferably mounted on the housing, and is movable into and out of protecting position. It is also preferably provided with means which operate automatically to fasten it in the protecting position. As embodied, this protecting device comprises a bail-like member, preferably of sheet metal, having a front reach 50 extending entirely across the upper front portion of the exterior end of the housing, and having two side reaches 51 and 52, substantially at right angles to the front reach, and extending along and close to the side walls 12 and 13 of the housing. This device is preferably connected to the housing, and as exemplified, it is pivotally connected thereto as shown at 53 and 54. It thus has a rocking or bail-like motion, and is swingable upwardly to permit the assembling and disassembling of the terminal block with the structure, and is swingable downwardly into protecting position. This member has angled top portions 55, which in the side reaches extend over and rest upon the top edges of the side walls 12 and 13 of the housing, and a similar top portion 56, which extends across above the outer top edge of the terminal block, as shown in Figs. 1 and 2. The protecting device has integral and downwardly-depending portions 57, which in the side members fit closely to the exterior of the side walls of the housing, and in the front member overhangs and protects the exterior top edge of the terminal block.

Figure 4:
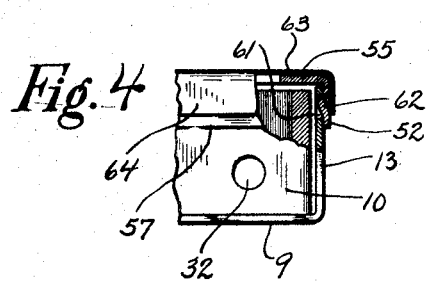
Fig. 4 is a fragmentary elevation, with parts in section, of the lower right-hand corner of Fig. 1.

Means are provided for automatically fastening this protecting device when it is moved into protecting position. As embodied, the side walls 12 and 13 of the housing have apertures 61 (Figs. 3 and 4) formed therein, and the downwardly depending parts 57 of the side reaches of the protective bail have tongues 62 formed therein, which are bent inwardly. When the bail is swung downwardly into position, these tongues snap into the corresponding openings, 61, and hold the device firmly in position. When an attendant wishes to move the protecting member, a tool or instrument can be inserted and the tongues pried out of the apertures and swung upwardly.

A closure is preferably provided for the top of the external portion of the housing, and as shown, it has a top flat portion 63, and dependent flanges 64 about three sides thereof, and fits snugly over the protecting member 50. A screw 65 passes through an opening in the lid 63 and is screw-threaded into an opening 66 in the plate 39 and the terminal block to hold the lid in position. Screw 65 and the lid 63 are provided with a seal 67.

From all the foregoing it will be understood that mechanism has been provided by my invention realizing the objects and advantages hereinbefore set forth, together with other objects and advantages; and that changes may be made from the details of construction disclosing without departing from the principles of the invention or sacrificing its chief advantages.

What I claim is:

1. An electrical instrument structure including in combination an instrument casing having an aperture, a terminal block housing about said aperture, a terminal block partially within the instrument casing and partially in the housing and extending through said aperture, a member cooperating with the housing and positioned to protect the exterior edge of the terminal block, and means for automatically holding said protecting member when so positioned.

2. An electrical instrument structure including in combination an instrument casing with an aperture therein, a terminal block projecting partially into the casing through the aperture, a housing fixed to the casing for protecting the exterior of the terminal block, a member cooperating with the housing and positionable to protect the outer edge of the terminal block, and a removable cover for the housing for permitting access to the terminal block without disturbing the instrument casing.

3. An electrical instrument structure including in combination an instrument casing with an aperture therein, a terminal block projecting partially into the casing through the aperture, a housing fixed to the casing for protecting the exterior of the terminal block, a removable housing cover member for permitting access to the terminal block without disturbing the instrument casing, and a member attached to the housing for protecting the outer edge of the terminal block and movable to further expose the terminal block.

4. An electrical instrument structure including in combination an instrument casing with an aperture therein, a terminal block projecting partially into the casing through the aperture, a housing fixed to the casing for protecting the exterior of the terminal block, a removable housing cover member for permitting access to the terminal block without disturbing the instrument casing, a member attached to the housing for protecting the outer edge of the terminal block and movable to further expose the terminal block and means for automatically locking said last named member in its protecting position.

5. An electrical instrument structure including in combination an instrument casing with an aperture therein, a terminal block projecting partially into the casing through the aperture, a housing fixed to the casing and covering the bottom and ends of the terminal block, and a member attached to the housing and movable to protect the edge and top of the terminal block not covered by the housing.

6. An electrical instrument structure including in combination an instrument casing with an aperture therein, a terminal block projecting partially into the casing through the aperture, a housing fixed to the casing and covering the bottom and ends of the terminal block, and a member pivotally attached to the housing and movable to protect the edge and top of the terminal block not covered by the housing.

7. A device for protecting the terminal block of an electricity meter including in combination a terminal block projecting from a meter casing, a housing fastened to the meter casing, and partially encasing the terminal block, and a member attached to the housing and movable to protect an exterior exposed edge of the terminal block.

8. A device for protecting the terminal block of an electricity meter including in combination a terminal block projecting from a meter casing, a housing fastened to the meter casing and encasing the ends of the terminal block, and a flanged U-shaped member pivotally attached to the end-encasing portions of the housing and movable to cover the exterior edge of the terminal block.

9. A device for protecting the terminal block of an electricity meter including in combination a terminal block projecting from a meter casing, a housing fastened to the meter casing and encasing the ends of the terminal block, and a flanged U-shaped member pivotally attached to the end-encasing portions of the housing and movable to cover the exterior edge of the terminal block and means for automatically latching said member to the housing in covering position.

In testimony whereof, I have signed my name to this specification.

PHILIPP VANNINI.